United States Patent
Seok

(10) Patent No.: US 10,051,627 B2
(45) Date of Patent: Aug. 14, 2018

(54) METHOD FOR CHANNEL ACCESS IN WIRELESS LAN SYSTEM AND APPARATUS THEREOF

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 15/028,698

(22) PCT Filed: Sep. 26, 2014

(86) PCT No.: PCT/KR2014/009024
§ 371 (c)(1),
(2) Date: Apr. 11, 2016

(87) PCT Pub. No.: WO2015/053499
PCT Pub. Date: Apr. 16, 2015

(65) Prior Publication Data
US 2016/0270079 A1    Sep. 15, 2016

Related U.S. Application Data

(60) Provisional application No. 61/889,488, filed on Oct. 10, 2013, provisional application No. 61/900,313, filed on Nov. 5, 2013.

(51) Int. Cl.
*H04W 72/04* (2009.01)
*H04W 74/04* (2009.01)
(Continued)

(52) U.S. Cl.
CPC ...... *H04W 72/0453* (2013.01); *H04B 7/0413* (2013.01); *H04L 5/0055* (2013.01);
(Continued)

(58) Field of Classification Search
CPC ......... H04W 72/0453; H04W 72/0433; H04W 72/0446; H04W 74/04; H04B 7/0413; H04L 5/0055
See application file for complete search history.

(56) References Cited

U.S. PATENT DOCUMENTS 6,987,770 B1    1/2006  Yonge
9,326,158 B2 *  4/2016  Abraham .......... H04W 74/0816
(Continued)

FOREIGN PATENT DOCUMENTS

JP    2010220226    9/2010
RU    2408167       12/2010
(Continued)

OTHER PUBLICATIONS

IP Australia Application Serial No. 2014332765, Office Action dated Feb. 9, 2017, 5 pages.
Wu, H.-T. et al., "A New EIFS Strategy for Performance Improvement of IEEE 802.11 Wireless LANs", Network Protocols and Algorithms, 2009, vol. 1, 9 pages.
(Continued)

*Primary Examiner* — Chi H Pham
*Assistant Examiner* — Weibin Huang
(74) *Attorney, Agent, or Firm* — Lee Hong Degerman Kang Waimey

(57) ABSTRACT

A method and an apparatus for channel access in a WLAN system are disclosed. A method by a station (STA) for channel access in a wireless local area network system, the method may comprise: receiving a frame; and determining if a wireless medium is idle using a time interval specified by an Extended Inter-Frame Space (EIFS) before performing a transmission in the wireless medium, wherein the EIFS is set to a dynamic value based on Cyclic Redundancy Code (CRC) status of a SIGNAL-A (SIG-A) field of the received frame.

12 Claims, 11 Drawing Sheets

(51) Int. Cl.
  *H04B 7/0413* (2017.01)
  *H04L 5/00* (2006.01)
  *H04W 84/12* (2009.01)
  *H04W 88/02* (2009.01)

(52) U.S. Cl.
  CPC ... *H04W 72/0433* (2013.01); *H04W 72/0446* (2013.01); *H04W 74/04* (2013.01); *H04W 84/12* (2013.01); *H04W 88/02* (2013.01)

(56) References Cited

U.S. PATENT DOCUMENTS

| | | | |
|---|---|---|---|
| 2007/0116035 A1 | 5/2007 | Shao et al. | |
| 2007/0171933 A1 | 7/2007 | Sammour et al. | |
| 2013/0010774 A1 | 1/2013 | Subramanian et al. | |
| 2013/0301569 A1* | 11/2013 | Wang | H04L 5/0055 370/329 |
| 2014/0071821 A1* | 3/2014 | Fang | H04W 24/00 370/230 |
| 2014/0169233 A1* | 6/2014 | Aggarwal | H04W 74/08 370/277 |
| 2015/0312940 A1* | 10/2015 | Xing | H04W 74/0816 370/329 |

FOREIGN PATENT DOCUMENTS

| | | |
|---|---|---|
| WO | 2013073921 | 5/2013 |
| WO | 13/122424 | 8/2013 |

OTHER PUBLICATIONS

Perahia, E. et al., "Delete the PMD (Comment Resolution for D3.0)", IEEE 802.11-12/1009r3, Aug. 2012, 19 pages.
Sandhya, Patil, "LB188 MAC comment resolutions", IEEE 802.11-12/0915r0, Jul. 2012, 4 pages.
Azizi, Shahmaz, "TGah D0.1 Comment Resolutions on 24.3.19 and 24.3.20", IEEE 802.11-11/xxxxr01, Jul. 2013, 10 pages.
Asterjadhi, A. et al., "Ack Policy for Short MAC Header", IEEE 802.11-13/0899r0, Jul. 2013, 7 pages.
Lei Lei, et al., "Analyzing and Improving the Simulation Algorithm of IEEE 802.11DCF Error Frame Model in QualNet Simulator," 2010 International Conference on Multimedia Information Networking and Security, XP031837323, Nov. 2010, 6 pages.
IEEE Computer Society, "Part II: Wireless LAN Medium Access Control (MAC) and Physical Layer (PHY) Specifications, Chapter 7," IEEE Std 802.11-2012, XP002736972, Mar. 2012, 12 pages.
IEEE Computer Society, "Part II Wireless LAN Medium Access Control (MAC) and Physical Layer (PHY) Specifications, Chapter 9," IEEE Std 802.11-2012, XP055174345, Mar. 2012, 158 pages.
Asterjadhi, et al., "ACK Indication and EIFS," doc.: IEEE 11-13/0512r0, XP55174925, May 2013, 16 pages.
Gast, "802.11ac: A Survival Guide," http://chimera.labs.oreilly.com/books/1234000001739/ch02.html, XP55174939, Jul. 2013, 12 pages.
PCT International Application No. PCT/KR2014/009024, Written Opinion of the International Searching Authority dated Jan. 2, 2015, 12 pages.
European Patent Office Application Serial No. 14003336.6, Search Report dated Mar. 18, 2015, 9 pages.

* cited by examiner

FIG. 10
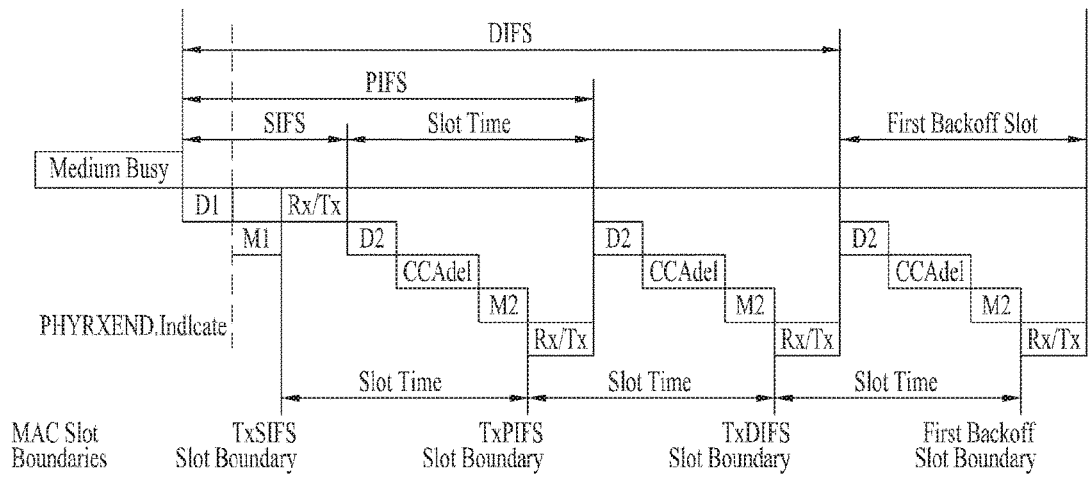
D1 = aRxRFDelay + aRxPLCPDelay (referenced from the end of the last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time - D1
FIG. 11
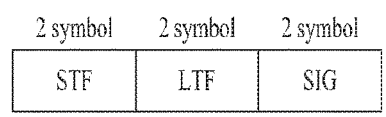
( a ) NDP MAC frame format (>= 2MHz)
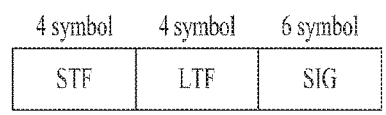
( b ) NDP MAC frame format (1MHz)

METHOD FOR CHANNEL ACCESS IN WIRELESS LAN SYSTEM AND APPARATUS THEREOF

CROSS-REFERENCE TO RELATED APPLICATIONS

This application is the National Stage filing under 35 U.S.C. 371 of International Application No. PCT/KR2014/009024, filed on Sep. 26, 2014, which claims the benefit of U.S. Provisional Application No. 61/889,488, filed on Oct. 10, 2013 and 61/900,313, filed on Nov. 5, 2013, the contents of which are all hereby incorporated by reference herein in their entirety.

TECHNICAL FIELD

The present invention relates to a wireless communication system, and more particularly to a method and an apparatus for channel access in a wireless LAN (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

An object of the present invention is to provide a method and apparatus for control and management of an Extended Inter-Frame Space (EIFS) in a wireless LAN (WLAN) system to support a response frame protection and to support channel access efficiencies.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, the object of the present invention can be achieved by providing a method for by a station (STA) for channel access in a wireless local area network system, the method may comprise: receiving a frame; and determining if a wireless medium is idle using a time interval specified by an Extended Inter-Frame Space (EIFS) before performing a transmission in the wireless medium, wherein the EIFS is set to a dynamic value based on Cyclic Redundancy Code (CRC) status of a SIGNAL-A (SIG-A) field of the received frame.

In another aspect of the present invention, a station (STA) device for channel access in a wireless local area network system, the STA device may comprise: transceiver; and processor, wherein the processor is configured to: control the transceiver to receive a frame; and determine if a wireless medium is idle using a time interval specified by an Extended Inter-Frame Space (EIFS) before performing a transmission in the wireless medium, wherein the EIFS is set to a dynamic value based on Cyclic Redundancy Code (CRC) status of a SIGNAL-A (SIG-A) field of the received frame.

The followings may be applied to one or more of the above aspects of the present invention.

The dynamic value of the EIFS may mean that the value of EIFS is changeable according to the CRC status of the SIG-A field.

The SIG-A field may carry information required to interpret the received frame.

The EIFS may be set to a value less than a sum of aSIFSTime, Distributed coordination function Inter-Frame Space (DIFS) and ACKTxTime, if the frame has no CRC failure in receiving the SIG-A field of the received frame, wherein the aSIFSTime is a nominal Short Inter-Frame Space (SIFS) value, and wherein the ACKTxTime is a time required to transmit an ACK frame.

The EIFS may be set to a value equal to a DIFS, if the frame has no CRC failure in receiving the SIG-A field of the received frame.

A PHY-RXEND.indication primitive may not contain a value of FormatViolation, if the frame has no CRC failure in receiving the SIG-A field of the received frame.

The DIFS may be derived by an equation of DIFS=aSIFSTime+2×aSlotTime, wherein the aSIFSTime is a nominal Short Inter-Frame Space (SIFS) value, and wherein the aSlotTime is a nominal Slot duration.

The EIFS may be derived by an equation of EIFS=aSIFSTime+DIFS+ACKTxTime, if the frame has CRC failure in receiving the SIG-A field of the received frame, wherein the aSIFSTime is a nominal Short Inter-Frame Space (SIFS) value, and wherein the ACKTxTime is a time required to transmit an ACK frame.

The PHY-RXEND.indication primitive may contain the value of FormatViolation, if the frame has CRC failure in receiving the SIG-A field of the received frame.

The SIG-A field may include a Response frame indication field.

The Response frame indication field may indicate one of No Response, Null Data Packet (NDP) Response, Normal Response or Long Response.

The STA may begin the transmission in the wireless medium, if the wireless medium is determined to be idle for the time interval specified by the EIFS.

The STA may perform a backoff procedure after waiting for the time interval specified by the EIFS, if the wireless medium is determined to be busy.

The STA may operate in Sub 1 GHz unlicensed band.

The EIFS may be set based on the CRC status of the SIG-A field of the received frame, regardless of CRC status of the SIG-B field of the received frame.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention may provide a method and apparatus for control and management of an Extended Inter-Frame Space (EIFS) in a wireless LAN (WLAN) system to support a response frame protection and to support channel access efficiencies.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 10 exemplarily shows DCF timing relationships.

FIG. 11 is a conceptual diagram illustrating a frame structure of NDP frames.

BEST MODE

Figure 1:
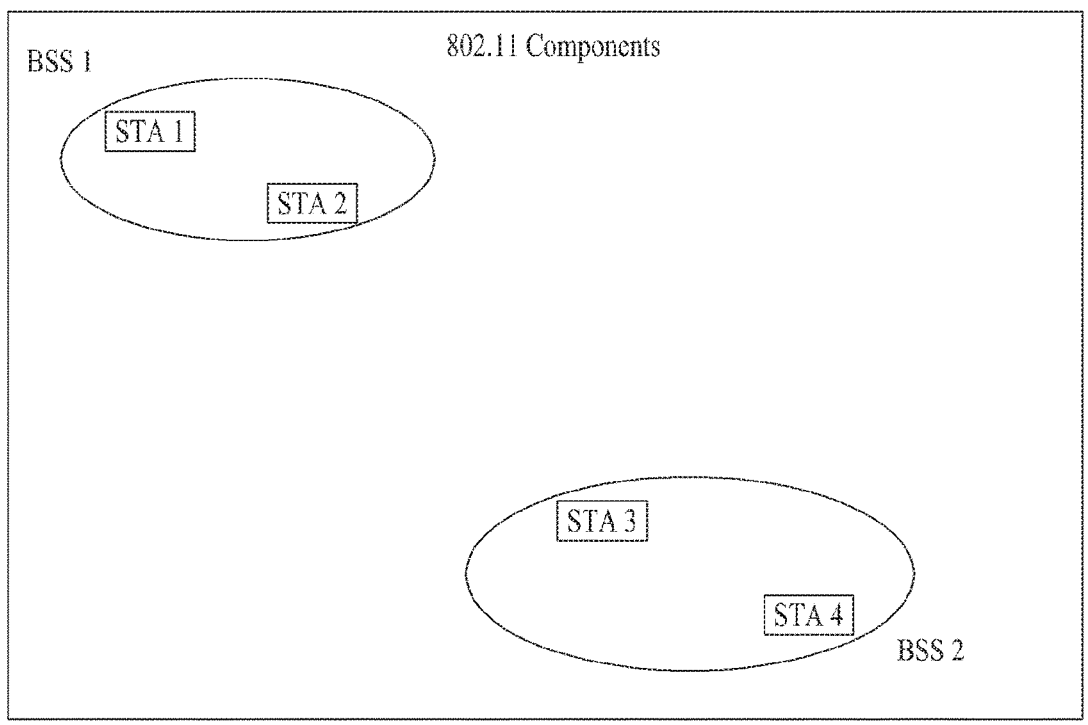
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
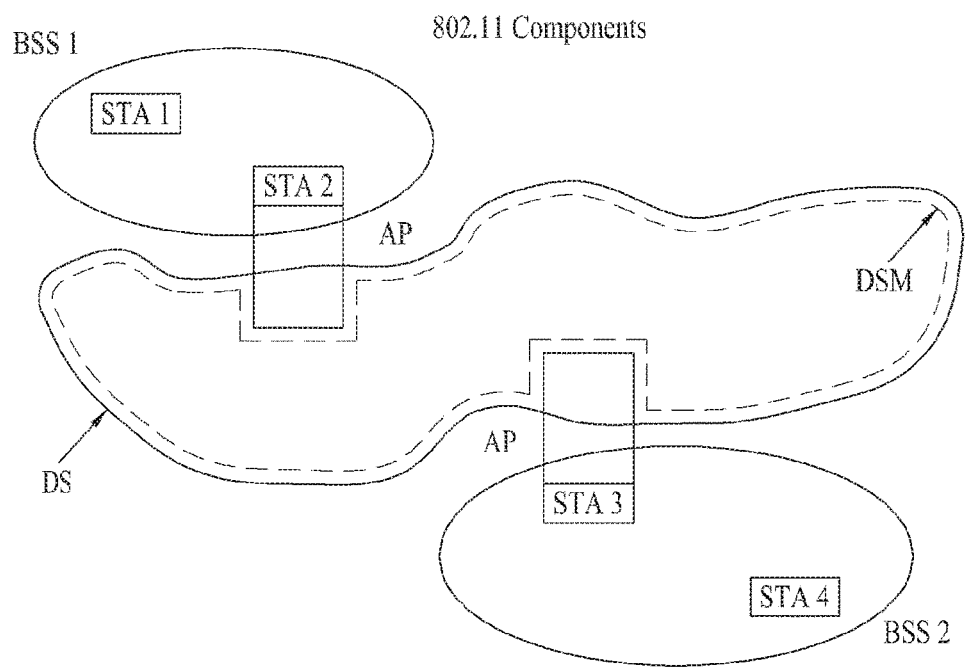
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP.

For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
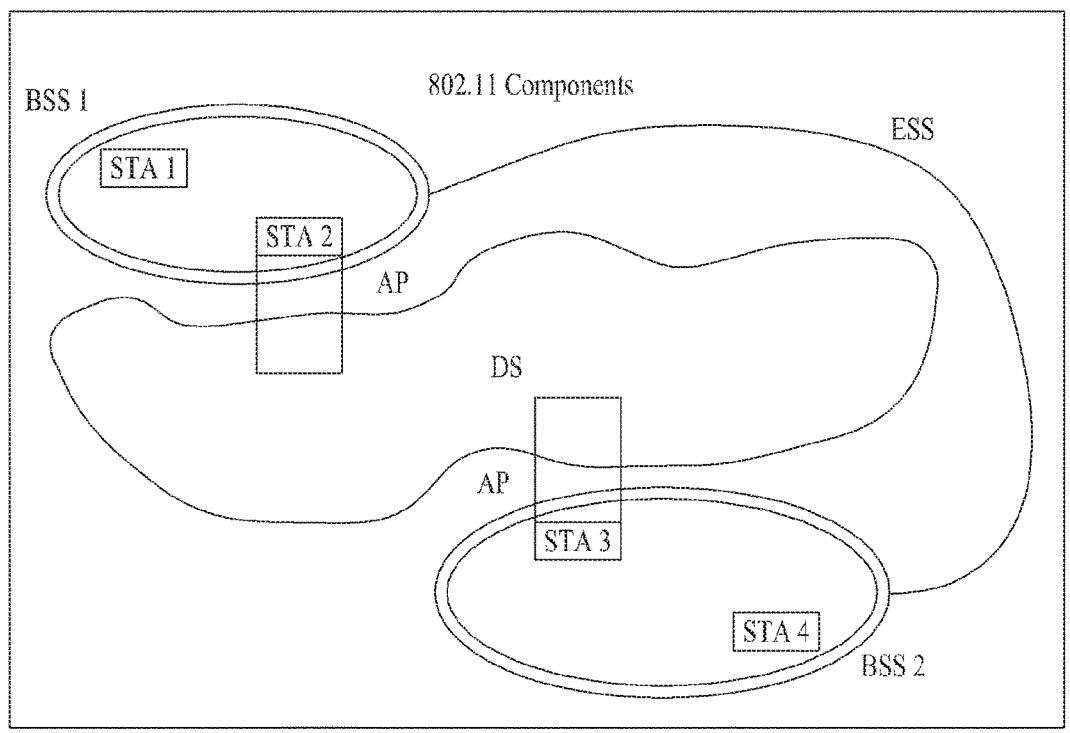
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
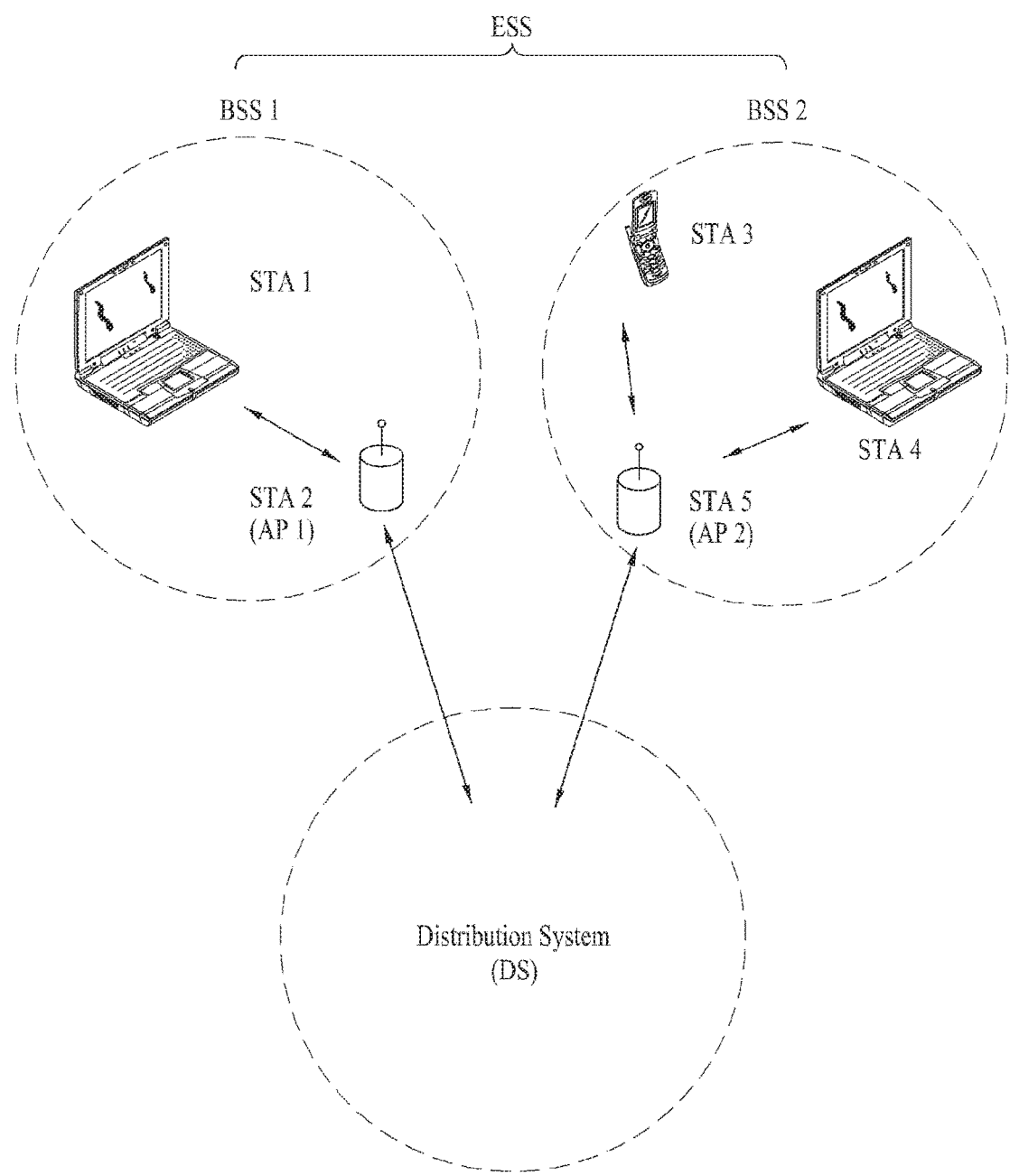
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
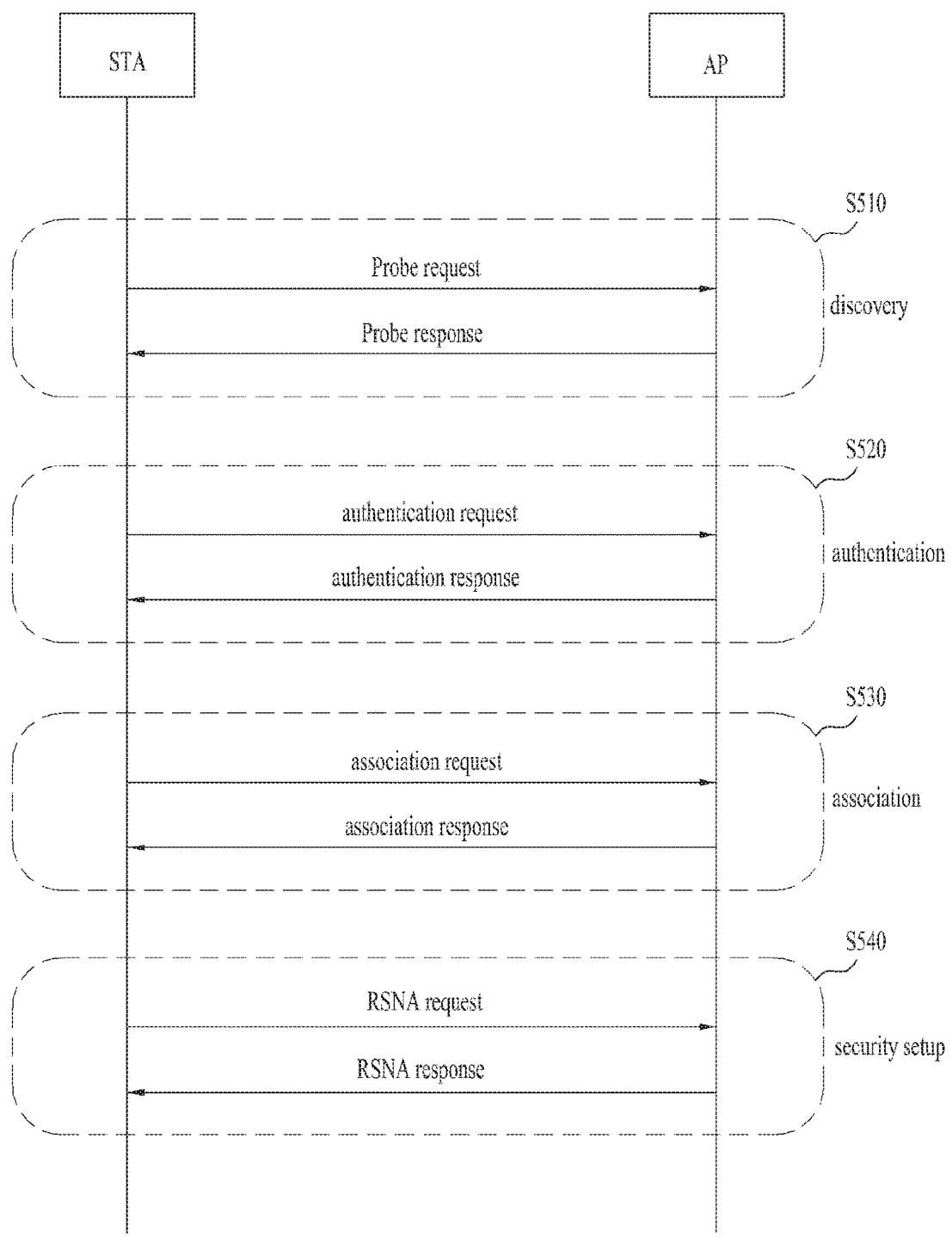
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to (or switches to) the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to (or switches to) another channel and records beacon frame information at each channel. The STA having received the beacon frame stores BSS-associated information contained in the received beacon frame, moves to (or switches to) the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS (Quality of Service) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

WLAN standard is being developed as IEEE 802.11 standard. IEEE 802.11a and IEEE 802.11b use an unlicensed band in 2.4. GHz or 5 GHz. IEEE 802.11b may provide a transfer rate of 11 Mbps, and IEEE 802.11a may provide a transfer rate of 54 Mbps. IEEE 802.11g may use an Orthogonal Frequency Division Multiplexing (OFDM) at 2.4 GHz, and provide a transfer rate of 54 Mbps. IEEE 802.11n may use a Multiple Input Multiple Output (MIMO)-OFDM, and provide a transfer rate of 300 Mbps to four spatial streams. IEEE 802.11n may support a maximum of 40 MHz for a channel bandwidth, and support a High Throughput (HT) of a maximum of 540 Mbps.

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

In order to provide a throughput of 1 Gbps or higher to MAC SAP, an IEEE 802.11 VHT system requests a channel bandwidth of 80 MHz or higher and at least 8 spatial streams. In order to assign at least 1 Gbps to an aggregated throughput of a VHT BSS, multiple VHT non-AP STAs must simultaneously use a channel. In order to allow multiple VHT non-AP STAs to simultaneously use a channel, VHT AP STA may use either Space Division Multiple Access (SDMA) or MU-MIMO. In other words, simultaneous transmission/reception may occur between a VHT AP STA and multiple VHT non-AP STAs.

In addition to the conventional 2.4 GHz band or 5 GHz band, an IEEE 802.11af standard for defining operation of an unlicensed device in a TV whitespace (TVWS) band, such as an idle-state frequency band (for example, 54~698 MHz band) caused by digitization of analog TVs, is currently being developed. The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence between unlicensed devices, a signaling protocol such as a common beacon frame, a frequency sensing mechanism, or the like may be required for the unlicensed devices.

Operations of all unlicensed devices are permitted in a band of 512~608 MHz and a band of 614~698 MHz. However, only communication between fixed devices is permitted in bands of 54~60 MHz, 76~88 MHz, 174~216 MHz, and 470~512 MHz. The term "fixed device" refers to a device that performs signal transmission only at a fixed location. An IEEE 802.11 TVWS terminal is an unlicensed device that operates, in the TVWS spectrum, using an IEEE 802.11 media access control (MAC) layer and a physical (PHY) layer.

An unlicensed device that desires to use the TVWS band should provide a function to protect licensed devices. Accordingly, the unlicensed device should check whether or not a licensed device is occupying the band before the unlicensed device starts signal transmission. To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmission power.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an wireless channel or medium during a predetermined time interval (for example, DCF Inter-Frame Space (DIFS)), prior to data transmission. If it is determined that the medium is in the idle state, frame transmission through the corresponding medium begins. Meanwhile, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
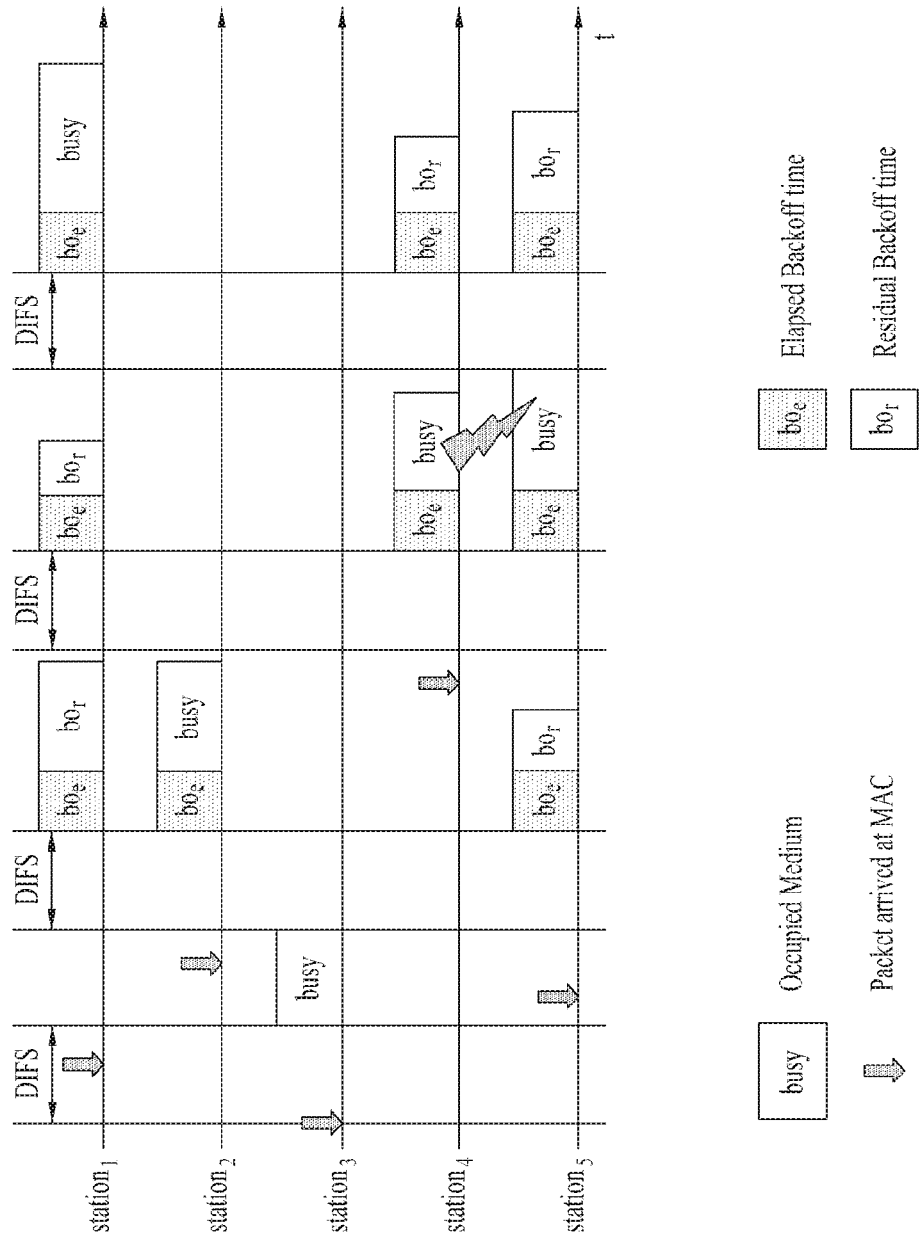
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
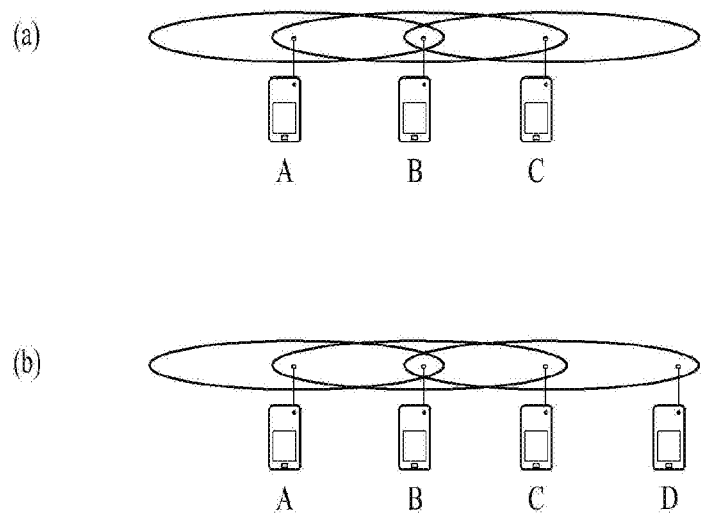
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
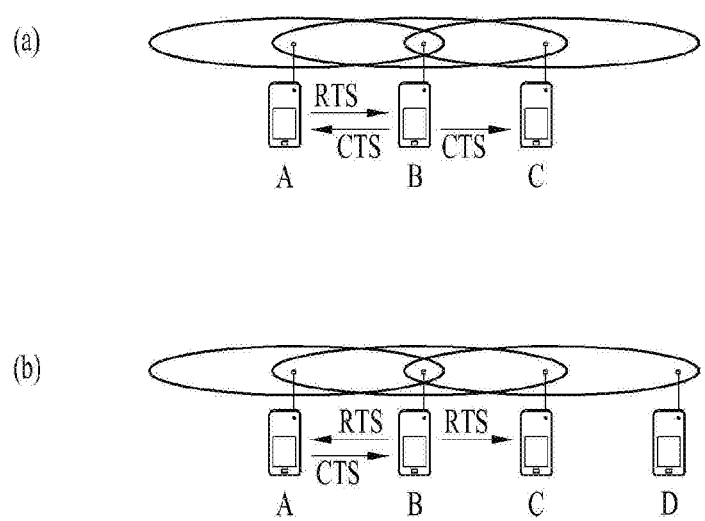
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheared by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Frame Format

Figure 9:
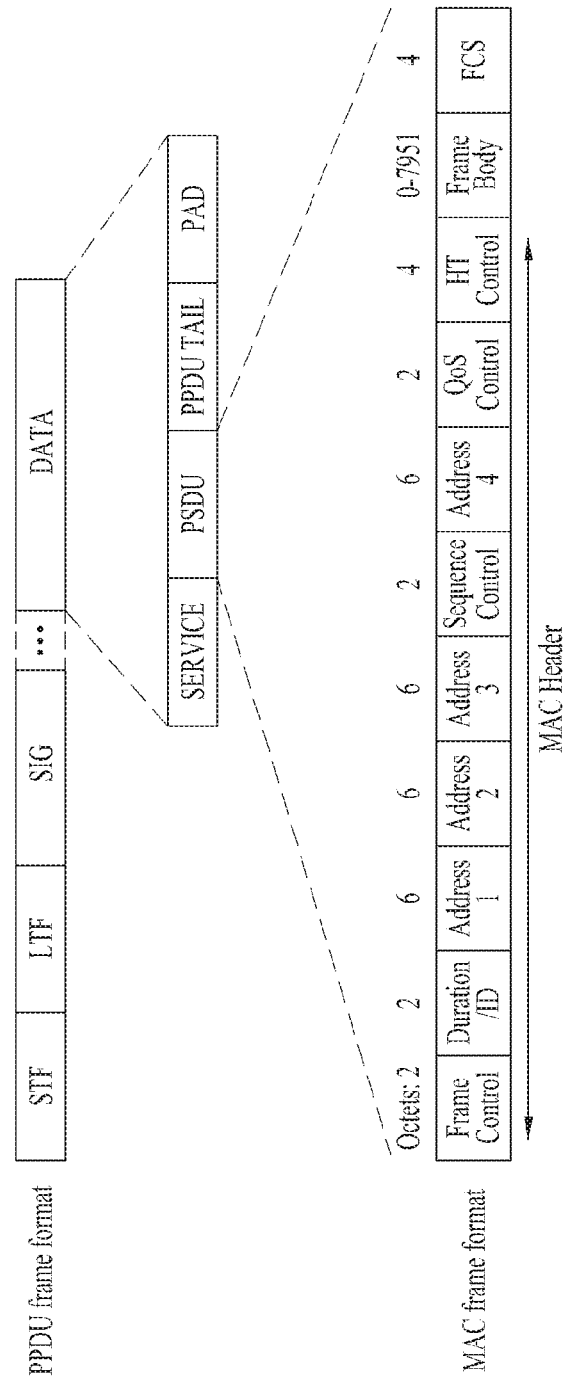
FIG. 9 is a conceptual diagram illustrating a frame structure for use in an IEEE 802.11 system.

FIG. 9 is a diagram for explaining an exemplary frame format used in IEEE 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an Orthogonal Frequency Division Multiplexing (OFDM) physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

MAC header may include a frame control field, a Duration/ID field, Address fields, Sequence Control field, QoS Control field, HT (High-Throughput) Control field, etc. The frame control field may include control information requisite for frame transmission/reception. The Duration/ID field may be established as a specific time for transmitting the corresponding frame or the like. Four Address fields (Address 1, Address 2, Address 3, Address 4) may indicate a Basic Service Set Identifier (BSSID), a Source Address (SA), a Destination Address (DA), a Transmitter Address (TA), a Receiver Address (RA), etc. Only some parts from among four address fields may be included according to frame types. A detailed description of Sequence Control, QoS Control field and HT Control sub-fields of the MAC header may refer to IEEE 802.11-2012 standard documents.

The Frame Control field of the MAC header may include subfields of Protocol Version, Type, Subtype, To DS, From DS, More Fragments, Retry, Power Management, More Data, Protected Frame, and Order. A detailed description of individual sub-fields of the frame control field may refer to IEEE 802.11-2012 standard documents.

Meanwhile, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

The Frame Control field of the short frame format may include subfields of Protocol Version, Type, PTID/Subtype, From DS, More Fragments, Power Management, More Data, Protected Frame, End of Service Period, Relayed Frame, and Ack Policy. Ack Policy field may be included in the QoS Control field of QoS Data frames or in the Frame Control field for Short frames. Ack Policy field may indicate No Ack, Normal Ack or Implicit Block Ack Request, or Block Ack.

Inter-Frame Space (IFS)

An IFS is a time interval between frames. A STA may perform carrier sensing to determine if a channel is occupied or idle for the time interval specified by the IFS. Various types of IFSs are defined to provide priority levels for access to the wireless medium.

Some examples of IFSs are Short IFS (SIFS), PCF IFS (PIFS), DCF IFS (DIFS), Extended IFS (EIFS). A SIFS is used for prior to transmitting CTS frame, ACK frames, etc. PIFS is used for transmitting PCF frames, and DIFS is used for transmitting DCF frames. A DCF uses EIFS before transmission, when it determines that the medium is idle following reception of a frame for which an indication from PHY contained an error or a frame for which the MAC FCS (Frame Check Sequence) value or the MAC CRC (cyclic redundancy code) value was not correct.

The different IFSs are independent of the STA bit rate. The IFS timings are defined as time gaps on the medium, and the IFS timings may be fixed for each PHY. The IFS values are determined from attributes specified by the PHY.

FIG. 10 exemplarily shows DCF timing relationships. All timings are referenced from the PHY-TXEND.confirm, PHY-TXSTART.confirm, PHY-RXSTART.indication, and PHY-RXEND.indication primitives.

Referring to FIG. 10, a nominal SIFS value (aSIFSTime) and a nominal Slot duration (aSlotTime) is determined for each PHY, aSIFSTime may have a fixed value, and aSlot-Time may vary dynamically according propagation time (aAirPropagationTime). Equations 1 and 2 are definitions of aSlotTime and aSlotTime.

$$a\text{SIFSTime} = a\text{RxRFDelay} + a\text{RxPLCPDelay} + a\text{MACProcessingDelay} + a\text{RxTxTurnaroundTime} \quad \text{[Equation 1]}$$

$$a\text{SlotTime} = a\text{CCATime} + a\text{RxTxTurnaroundTime} + a\text{AirPropagationTime} + a\text{MACProcessingDelay} \quad \text{[Equation 2]}$$

The parameter aRxRFDelay is described as a nominal time (in microseconds) between the end of a symbol at the air interface to the issuance of a PMD_DATA.indication primitive to the PLCP. The PMD_DATA.indication primitive defines the transfer of data from the physical medium dependent entity (PMD entity) to the PLCP sublayer.

The parameter aRxPLCPDelay is described as a nominal time (in microseconds) that the PLCP uses to deliver the last bit of a received frame from the PMD receive path to the MAC.

The parameter aMACProcessingDelay is described as a maximum time (in microseconds) available for the MAC to issue a PHY-TXSTART.request primitive pursuant to a PHY-RXEND.indication primitive (for response after SIFS) or PHY-CCA.indication(IDLE) primitive (for response at any slot boundary following a SIFS). The PHY-TXSTAR-T.request primitive is a request by the MAC sublayer to the local PHY entity to start the transmission of a PSDU. The PHY-CCA.indication primitive an indication by the PHY to the local MAC entity of the current state of the medium and to provide observed idle power indicator (IPI) values when IPI reporting is turned on.

The parameter aRxTxTurnaroundTime is described as a maximum time (in microseconds) that the PHY requires to change from receiving to transmitting the start of the first symbol.

The parameter aCCATime is described as a maximum time (in microseconds) the CCA mechanism has available to assess the medium within every time slot to determine whether the medium is busy or idle.

Equations 3 and 4 are definitions of PIFS and DIFS.

$$\text{PIFS} = a\text{SIFSTime} + a\text{SlotTime} \quad \text{[Equation 3]}$$

$$\text{DIFS} = a\text{SIFSTime} + 2 \times a\text{SlotTime} \quad \text{[Equation 4]}$$

Equation 5 is a definition of EIFS.

$$\text{EIFS} = a\text{SIFSTime} + \text{DIFS} + \text{ACKTxTime} \quad \text{[Equation 5]}$$

The parameter ACKTxTime is described as the time expressed in microseconds required to transmit an Ack frame, including preamble, PHY header and any additional PHY dependent information, at the lowest PHY mandatory rate.

FIG. 10 illustrates the relation between the SIFS, PIFS, and DIFS as they are measured on the medium and the different MAC slot boundaries TxSIFS, TxPIFS, and TxDIFS. These slot boundaries define when the transmitter shall be turned on by the MAC to meet the different IFS timings on the medium, after subsequent detection of the CCA result of the previous slot time.

Equations 6, 7 and 8 define the MAC Slot Boundaries, using attributes provided by the PHY, which are such that they compensate for implementation timing variations. The starting reference of these slot boundaries is again the end of the last symbol of the previous PPDU.

$$\text{TxSIFS} = \text{SIFS} - a\text{RxTxTurnaroundTime} \quad \text{[Equation 6]}$$

$$\text{TxPIFS} = \text{TxSIFS} + a\text{SlotTime} \quad \text{[Equation 7]}$$

$$\text{TxDIFS} = \text{TxSIFS} + 2 \times a\text{SlotTime} \quad \text{[Equation 8]}$$

Dynamic Extended Inter-Frame Space (Dynamic EIFS)

The present invention proposes an efficient control/management of EIFS.

As shown in Equation 5, ACKTxTime is added in calculation of EIFS to reflect that the ACK frame will be transmitted as a response frame of the received frame. If a STA cannot determine a frame type or duration information of the received (or overheard) frame because the received frame has an error, the STA assumes that an actual recipient STA may transmit a response frame, and defer channel access for ACKTxTime to protect the response frame transmitted by the actual recipient STA.

Conventionally, ACKTxTime of EIFS calculation is determined based on an assumption of the lowest PHY mandatory rate in order to cover Maximum ACK Transmission Time, since the STA cannot predict the length of the response frame transmitted by the actual recipient STA. As such, a response frame having unknown length transmitted by the actual recipient STA may be fully protected by calculating EIFS in consideration of the Maximum ACK Transmission Time. Meanwhile, if the actual recipient STA transmits a response frame shorter than the Maximum ACK Transmission Time, the remaining time is not used by any other STAs. In this case, channel accesses of other STAs are overly deferred and the channel usage efficiencies are degraded.

The present invention proposes a dynamic EIFS scheme including calculating (or configuring or setting) the EIFS by using additional information from the PPDU having an error, in order to solve the problems of inefficiencies of channel access with protecting the response frame.

As described above, the EIFS may be used in two cases: i) a STA receives PSDU but a failure occurs in MAC CRC (cyclic redundancy code) due to a channel error; ii) an indication from PHY (e.g., PHY-RXEND.indication primitive) contains an error.

The case ii) includes a case when a PLCP header has an error (e.g., Format Violation), or a case when nonsupported data rate is detected (e.g., Unsupported Rate). Table 1 shows parameters returned for each of error conditions.

TABLE 1

| Parameter | Description |
| --- | --- |
| NoError | This value is used to indicate that no error occurred during the receive process in the PHY. |
| FormatViolation | This value is used to indicate that the format of the received PPDU was in error. |
| CarrierLost | This value is used to indicate that during the reception of the incoming PSDU, the carrier was lost and no further processing of the PSDU can be accomplished. |
| UnsupportedRate | This value is used to indicate that during the reception of the incoming PPDU, a non-supported date rate was detected. |

Dynamic EIFS scheme for the case i) is described as follows.

The PLCP header of the received PPDU contains Short Guard Interval (SGI) field in the SIG field. If the SGI field has a value of 1 (i.e., the received PPDU uses Short GI), the response frame also uses Short GI. For example, when a CONTROL frame such as ACK frame is transmitted as a response frame, if a DATA frame used a Short GI option, the following ACK frame also uses a Short GI option. Accordingly, it is proposed that Short GI is used when calculating ACKTxTime for EIFS, if the PPDU received with error has a SGI field having value of 1.

Dynamic EIFS scheme for the case ii) is described as follows.

If the error of the received PPDU has occurred in PLCP header, additional information for predicting ACKTxTime for EIFS cannot be obtained. Meanwhile, if a transmission time for a frame having a specific frame type is fixed, a STA may determine a frame type from the transmission time of the frame, and calculating the ACKTxTime based on the determined frame type.

For example, NDP frames (or NDP MAC frames) have different transmission times for different types of NDP frames. As described above, an NDP frame has STF, LTF and SIG fields only, and no PSDU, STF or LTF is transmitted after SIG field. NDP frames may be used for reducing protocol overhead in a WLAN system operating under 1 GHz unlicensed band (e.g., IEEE 802.11 Task Group ah (Sub 1 GHz (SIG) License Exempt Operation) using 1/2/4/8/16 MHz channel bandwidth). NDP MAC frames includes a control frame (e.g., CTS frame, ACK frame, Block ACK frame, . . . ) with information encoded in SIG field of PLCP header without configuring MPDU.

FIG. 11 is a conceptual diagram illustrating a frame structure of NDP frames.

FIG. 11(a) shows an example of NDP MAC frame format used for a channel width greater than or equal to 2 MHz (>=2 MHz). FIG. 11(b) shows an example of NDP MAC frame format used for a channel width of 1 MHz. It is noted that the respective length of STF, LTF and SIG fields are 2, 2 and 2 OFDM symbols for the NDP MAC frame format for >=2 MHz, and 4, 4 and 6 OFDM symbols for the NDP MAC frame format for 1 MHz.

According to Dynamic EIFS scheme of the present invention, if a STA receives a PPDU with error in the PLCP header and the transmission time (or a number of OFDM symbols) of the received PPDU corresponds to 6 symbols (FIG. 11(a)) or 14 symbols (FIG. 11(b)), the STA considers the received PPDU as a control frame and exclude ACKTxTime from EIFS, since no response frame is transmitted in response to NDP MAC frame.

If the STA considers that the received PPDU with error is one of the NDP MAC frame (e.g., NDP CTS frame, NDP ACK frame, NDP Block ACK frame, . . . ), then it calculates EIFS without considering ACKTxTime and aSIFSTime, resulting in EIFS=DIFS.

If the STA considers that the received PPDU with error is not any of the NDP MAC frame (i.e., the transmission time of the received PPDU does not correspond to 6 symbols or 14 symbols), then it calculates the EIFS with considering ACKTxTime and aSIFSTime, resulting in EIFS=aSIFSTime+DIFS+ACKTxTime.

Table 2 shows contents of SIG field of NDP ACK frame for 1 MHz, and Table 3 shows contents of SIG field of NDP ACK frame for >=2 MHz as an examples of NDP MAC frames. Detailed descriptions of Table 2 and 3 is referred to in the Draft Standard—IEEE P802.11ah.

TABLE 2

| Field | Size (bits) | Description |
| --- | --- | --- |
| NDP MAC Frame Type | 3 | NDP MAC Frame Type field is set to 2 |

TABLE 2-continued

| Field | Size (bits) | Description |
|---|---|---|
| ACK ID | 9 | The ACK ID field is 9 bits in length and is set to the bit sequence Scrambler Initialization[0:6] ‖ FCS[30:31] ("‖" is concatenation) obtained from the Scrambler Initialization value in the Service field prior to descrambling, and the FCS field of the PSDU that carries the soliciting frame. |
| More Data | 1 | The More Data field is 1 bit in length and is used to indicate to a STA in Power Save (PS) mode that more Buffered Units (Bus) are buffered for that STA at the AP. |
| Duration Indication | 1 | The Duration Indication field is 1 bit in length and is set to 0 if the value of the Duration field sets the network allocation vector (NAV) as described in 8.2.5 (Duration/ID field (QoS STA)). Otherwise, it is set to 1 if the value of the Duration field indicates an idle period. |
| Duration | 10 | The Duration field is 10 bits in length. If the Duration Indication field is set to 0 the Duration field is set as described in 8.2.5.7 (Setting for control response frames) where the value is expressed in multiples of 40 us. If the Duration value is set to 1 the Duration field is set to the duration of time, in milliseconds, during which an idle period (during which there is no frame transmission) is expected from the STA that elicited the response, starting from the end of the NDP ACK response. |
| Relayed Frame | 1 | The Relayed Frame field is 1 bit in length and it is set as described in 9.32n.3 (Procedures TXOP sharing) and 9.32n.3.3 (Flow Control). |

TABLE 3

| Field | Size (bits) | Description |
|---|---|---|
| NDP MAC Frame Type | 3 | NDP MAC Frame Type field is set to 2 |
| ACK ID | 16 | The ACK ID field is 16 bits in length and is set to the bit sequence Scrambler Initialization[0:6] ‖ FCS[23:31] ("‖" is concatenation) obtained from the Scrambler Initialization value in the Service field (as defined in 24.3.9.2 (Service field)) prior to descrambling, and the FCS field of the PSDU that carries the soliciting frame. |
| More Data | 1 | The More Data field is 1 bit in length and is used to indicate to a STA in PS mode that more BUs are buffered for that STA at the AP. |
| Duration Indication | 1 | The Duration Indication field is 1 bit in length and is set to 0 if the value of the Duration field sets the NAV as described in 8.2.5 (Duration/ID field (QoS STA)). Otherwise, it is set to 1 if the value of the Duration field indicates an idle period. |
| Duration | 14 | The Duration field is 14 bits in length. If the Duration Indication field is set to 0 the Duration field is set as described in 8.2.5.7 (Setting for control response frames). If the Duration value is set to 1 the Duration field is set to the duration of time, in milliseconds, during which an idle period (during which there is no frame transmission) is expected from the STA that elicited the response, starting from the end of the NDP ACK response. |
| Relayed Frame | 1 | The Relayed Frame field is 1 bit in length and it is set as described in 9.32n.3 (Procedures TXOP sharing), and 9.32n.3.3 (Flow Control). |
| Reserved | 1 | The Reserved field is 1 bit in length and is set to 0. |

In addition, Dynamic EIFS scheme for SU/MU Frame is described as follows.

Figure 12:
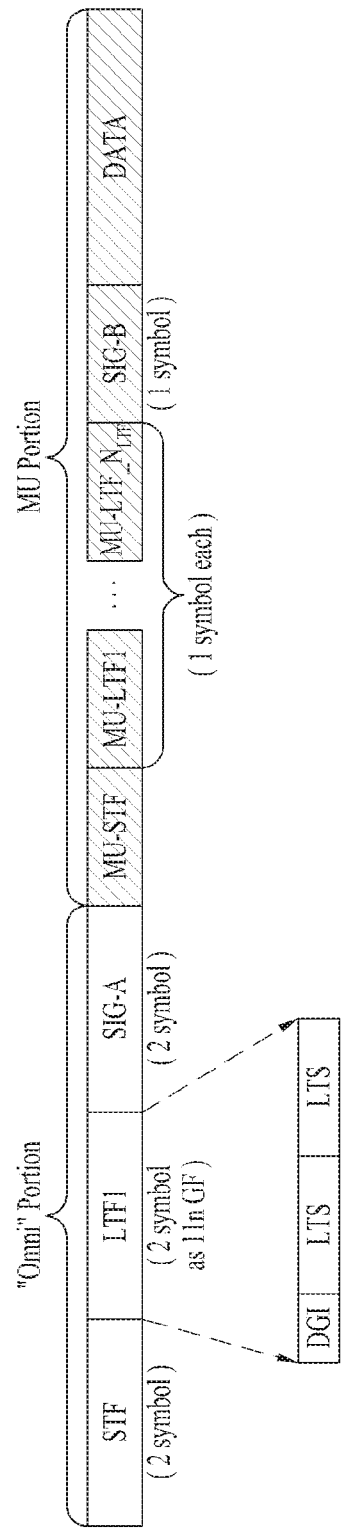
FIG. 12 is a conceptual diagram illustrating a frame structure of SU/MU frame.

FIG. 12 is a conceptual diagram illustrating a frame structure of SU/MU frame.

The Single-User (SU) frame may be used in SU-MIMO, and the Multi-User (MU) frame may be used in MU-MIMO. Referring to FIG. 12, STF, LTF1, and SIG-A (SIGNAL-A) fields may correspond to an Omni Portion because they are transmitted to all STAs in omni directions. If necessary, beamforming or precoding may not be applied to STF, LTF1, and SIG-A (SIGNAL-A) fields in case of data transmission.

Meanwhile, MU-STF, MU-LTF1, MU-LTF_$N_{LTF}$, and SIG-B (SIGNAL-B) fields located after the SIG-A field are user-specifically transmitted, and beamforming or precoding may be applied to each field before such transmission. The MU portion may include MU-STF, MU-LTF(s), SIG-B, and data fields as shown in the frame format of FIG. 12.

In the Omni Portion, each of STF, LTF1, and SIG-A fields may be transmitted as a single stream in association with each subcarrier, as represented by the following equation 1:

$$[x_k]_{N_{TX} \times 1} = [Q_k]_{N_{TX} \times 1} d_k \qquad \text{[Equation 9]}$$

In Equation 9, k is a subcarrier (or tone) index, $x_k$ is a signal transmitted at a subcarrier k, and $N_{TX}$ is the number of Tx antennas. $Q_k$ is a column vector for encoding (e.g., space-mapping) a signal transmitted on a subcarrier (k), and $d_k$ is data being input to the encoder. In Equation 9, a Cyclic Shift Delay (CSD) of a time domain may be applied to $Q_k$. CSD of the time domain denotes a phase rotation or a phase shift on a frequency domain. Therefore, $Q_k$ may include a phase shift value on a tone (k) caused by the time domain CSD.

In the case of using the frame format of FIG. 12, STF, LTF1, and SIG-A fields may be received by all STAs. Each STA may decode the SIG-A field through channel estimation based on STF and LTF1.

The SIG-A field may include Length/Duration information, Channel Bandwidth information, and Number of Spatial Streams information. The SIG-A field may have the length of two OFDM symbols. One OFDM symbol uses a Binary Phase Shift Keying (BPSK) modulation for 48 data tones, such that 24-bits information may be represented on one OFDM symbol. Accordingly, the SIG-A field may include 48-bits information.

The following Table 4 shows exemplary bit allocation of the SIG-A field with respect to the SU case and the MU case.

TABLE 4

| Field | SU | MU |
|---|---|---|
| SU/MU Indication | 1 | 1 |
| Length/Duration | 9 | 9 |
| MCS | 4 | |
| BW | 2 | 2 |
| Aggregation | 1 | |
| STBC | 1 | 1 |
| Coding | 2 | 5 |
| SGI | 1 | 1 |
| GID | | 6 |
| Nsts | 2 | 8 |
| PAID | 9 | |
| Response frame indication | 2 | 2 |
| Reserved | 3 | 3 |
| CRC | 4 | 4 |
| Tail | 6 | 6 |
| Total | 48 | 48 |

The SU/MU indication field may be used to discriminate between the SU frame format and the MU frame format.

The Length/Duration field represents OFDM symbols (i.e., duration) of the frame or the number of bytes (i.e., length) of the frame. If the aggregation field of the SU field is set to the value of 1, the Length/Duration field is interpreted as the duration field. In contrast, if the aggregation field is set to zero (0), the Length/Duration field is interpreted as the length field. The aggregation field is not defined in the MU frame, and the aggregation field is always applied to the MU field, such that the Length/Duration field is interpreted as the duration field.

The MCS field indicates the modulation and coding scheme for use in PSDU transmission. In case of the SU frame, the MCS field is transmitted through the SIG-A field. If other STAs (each of which may also be referred to as 3$^{rd}$ party STA indirectly associated with transmission/reception between two STAs) are configured to receive the SU frame, the duration of the SU frame (i.e., SU-beamformed frame having an aggregation field of 0) currently received can be calculated on the basis of both the length value of the Length/Duration field and the value of the MCS field. On the other hand, in the MU field, the MCS field is not contained in the SIG-A field, and is contained in the SIG-B field carrying user-specific information, such that an independent MCS may be applied for each user.

The BW field represents a channel bandwidth of the SU frame or the MU frame. For example, the BW field may be set to a specific value indicating one of 2 MHz, 4 MHz, 8 MHz, 16 MH, and 8+8 MHz.

The Aggregation field indicates whether a PSDU is aggregated in the form of an aggregation MPDU (i.e., A-MPDU). If the aggregation field is set to 1, this means that a PSDU is aggregated in the form of A-MPDU and then transmitted. If the aggregation field is set to 0, this means that a PSDU is transmitted without aggregation. In the MU frame, PSDU configured in the form of A-MPDU is always transmitted, the aggregation field need not be signaled, such that the PSDU is not contained in the SIG-A field.

A Space Time Block Coding (STBC) field indicates whether STBC is applied to the SU frame or the MU frame.

The Coding field indicates the coding scheme for use in the SU frame or the MU frame. A Binary Convolutional Code (BCC) scheme, a Low Density Parity Check (LDPC) scheme, etc. may be applied to the SU frame. Independent coding schemes of individual users may be applied to the MU frame, such that the coding field composed of 2 bits or greater may be defined to support the independent coding schemes.

The Short Guard Interval (SGI) field indicates whether a Short GI is applied to PSDU transmission of the SU frame or the MU frame. In case of the MU frame, if SGI is applied to the MU frame, this means that the SGI can be commonly applied to all users contained in the MU-MIMO group.

The GID field represents Multi-User (MU) group information of the MU frame. In case of the SU frame, a user group need not be defined, so that the GID field is not contained in the SIG-A field.

The Nsts field indicates the number of space-time streams of the SU frame or the MU frame. In case of the MU frame, the Nsts field represents the number of space streams of each STA contained in the corresponding MU group, such that 8 bits are required for the Nsts field. In more detail, a maximum of 4 users may be contained in one MU group and a maximum of space streams may be transmitted to each user, such that 8 bits are needed to correctly support the above-mentioned structure.

The Partial AID (PAID) field may represent an ID of an STA configured to identify a reception STA for use in the SU frame. The PAID value in an uplink (UL) frame is composed of some parts of Basic Service Set ID (BSSID). In a downlink (DL) frame, the PAID value may be composed of the AID-hashed result of the STA. For example, BSSID may be 48 bits long, AID may be 16 bits long, and PAID may be 9 bits long.

The Response frame indication field indicates the type of an Response frame to be transmitted after the SU frame or the MU frame. For example, the types of Response frames may be No Response, NDP Response, Normal Response, Long Response. The Response frame indication field may be referred to as Response Indication field.

If a STA determined a type of a Response frame of the received frame, it may predict a value of the Duration field of MPDU MAC header, even if an error occurs in the MPDU of the received frame.

Figure 13:
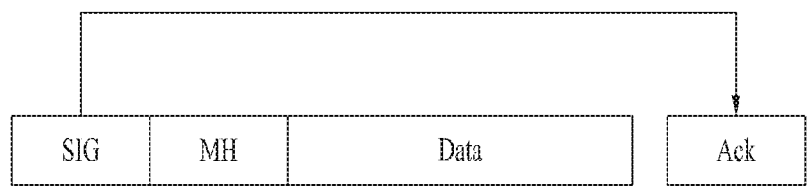
FIG. 13 shows an example of using the Response frame indication field of SIG field of PLCP header of the received frame.

FIG. 13 shows an example of using the Response frame indication field of SIG field of PLCP header of the received frame.

For example, if the Response frame indication field indicates No Response, the STA may predict (or determine) that the value of the Duration field of MPDU MAC header of the received frame is 0.

If the Response frame indication field indicates NDP Response (or NDP Control Response), the STA may predict (or determine) that the value of the Duration field of MPDU MAC header of the received frame is PLCP header transmission time plus SIFS.

If the Response frame indication field indicates Normal Response (or Normal Control Response), the STA may predict (or determine) that the value of the Duration field of MPDU MAC header of the received frame is CTS/ACK/BlockACK transmission Time plus SIFS.

If the Response frame indication field indicates Long Response, the STA may predict (or determine) that the value of the Duration field of MPDU MAC header of the received frame is MAX_PPDU transmission Time plus SIFS for indicating any response frame.

Meanwhile, the SIG-B field in the MU frame shown in FIG. 12 may further include user-specific information. The following Table 5 exemplarily shows fields used as constituent elements of the SIG-B field of the MU frame. In addition, Table 5 exemplarily shows various parameters applied to PPDUs of respective bandwidths (BWs) 2, 4, 8 and 16 MHz.

TABLE 5

|  | BW | | | |
| --- | --- | --- | --- | --- |
|  | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 9 | 9 | 11 | 11 |
| Total | 26 | 27 | 29 | 29 |

In Table 5, an MCS field may indicate an MCS field of a PPDU transmitted in the form of an MU frame per user.

A TAIL bit may enable an encoder to return to a zero (0) state.

The CRC (Cyclic Redundancy Code) field may be used to detect an error from an STA configured to receive the MU frame.

According to the above described Dynamic EIFS scheme, a STA receives a PPDU having an error on PLCP Header, the STA determines if the transmission time (a number of OFDM symbols) of the PPDU corresponds to one of NDP MAC frame (i.e., the transmission time of the received PPDU corresponds to 6 symbols or 14 symbols). If the STA received a MU frame having transmission time other than 6 symbols or 14 symbols, the STA considers the received PPDU with error is not any of NDP MAC frame, and then the STA calculates the EIFS with considering ACKTxTime and aSIFSTime, resulting in EIFS=aSIFSTime+DIFS+ACKTxTime.

Enhancement of the above described Dynamic EIFS scheme includes setting EIFS based on the error of the received frame has occurred in SIG-A or SIG-B. Specifically, if a STA receives a frame with an error, the EIFS is set to a different values (or dynamic values) based on at least one of a CRC status of SIG-A or a CRC status of SIG-B.

Table 6 shows examples of setting EIFS values based on SIG-A CRC status and SIG-B CRC status.

TABLE 6

| SIG-A CRC Status | SIG-B CRC Status | EIFS parameter value |
| --- | --- | --- |
| Pass | Pass | Determined by Response frame indication field in SIG-A |
| Pass | Fail | Determined by Response frame indication field in SIG-A |
| Fail | Fail | aSIFSTime + DIFS + ACKTxTime |
| Fail | Pass | aSIFSTime + DIFS + ACKTxTime |

In Table 6, SIG-A/SIG-B CRC Status Pass (or CRC OK) means that SIG-A/SIG-B is successfully decoded, and the PHY-RXEND.indication primitive does not contain FormatViolation. SIG-A/SIG-B CRC Status Fail means that SIG-A/SIG-B is not successfully decoded, and the PHY-RXEND.indication primitive is set to FormatViolation.

As shown in Table 6, even though the SIG-B CRC status is Pass, if the SIG-A CRC status is Fail, the EIFS parameter value is set to aSIFSTime+DIFS+ACKTxTime. In addition, even though the SIG-B CRC status is Fail, if the SIG-A CRC status is Pass, the EIFS parameter value is set according to Response frame indication field in SIG-A. In other words, regardless of SIG-B CRC status, the EIFS is dynamically set according to SIG-A CRC status.

If a STA predicts a value of the Duration field of MPDU MAC header and sets NAV (or virtual carrier sense) using the Response frame indication field in SIG-A, the EIFS may be simply set to DIFS (i.e., EIFS=DIFS). Accordingly, the EIFS parameter may be set as shown in Table 7, if a STA is configured to set NAV (or virtual carrier sense) using the Response frame indication.

TABLE 7

| SIG-A CRC Status | SIG-B CRC Status | EIFS parameter value |
| --- | --- | --- |
| Pass | Pass | DIFS |
| Pass | Fail | DIFS |
| Fail | Fail | aSIFSTime + DIFS + ACKTxTime |
| Fail | Pass | aSIFSTime + DIFS + ACKTxTime |

As shown in Table 7, the EIFS is set to DIFS if a STA receives a frame having no CRC Fail in SIG-A (e.g., if the STA receives the frame for which the PHY-RXEND.indication primitive does not contain FormatViolation). Otherwise (e.g., if the STA receives the frame for which the PHY-RXEND.indication primitive contains FormatViolation), the EIFS for the STA is derived by the Equation 5 (i.e., EIFS=aSIFSTime+DIFS+ACKTxTime). In addition, Table 7 shows that, not the SIG-B CRC status, but the SIG-A CRC status influences the dynamic value of the EIFS parameter. Accordingly, the EIFS is set to a dynamic value based on the SIG-A CRC status as shown in Table 8.

TABLE 8

| SIG-A CRC Status | EIFS parameter value |
| --- | --- |
| Pass | DIFS |
| Fail | aSIFSTime + DIFS + ACKTxTime |

In addition, for the various examples of Dynamic EIFS using the parameter ACKTxTime, the ACKTxTime may be set or calculated based on the value of the Response frame indication field. For example, if the Response frame indication field indicates Normal Response, the ACKTxTime is set to a time length required to transmit a normal transmission time. If the Response frame indication field indicates NDP Response, ACKTxTime is set to a time length required to transmit a NDP MAC frame for 1 MHz (FIG. 11(b)) or a NDP MAC frame for >=2 MHz (FIG. 11(a)).

Figure 14:
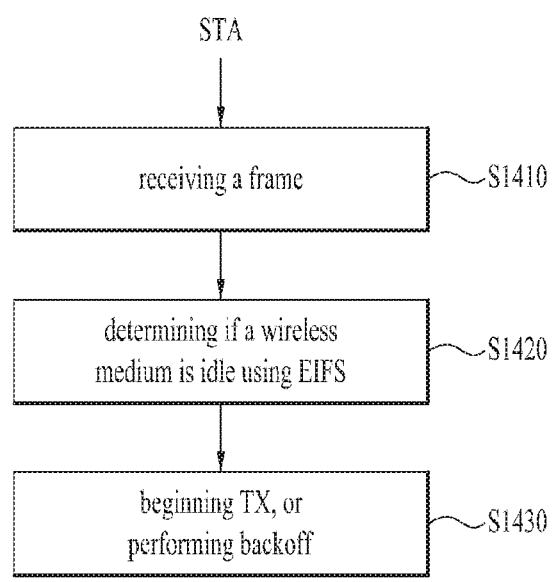
FIG. 14 is a flowchart illustrating a method for channel access according to the present invention.

FIG. 14 is a flowchart illustrating a method for channel access according to the present invention.

A STA may be in RX IDLE state and the performs CS/CCA procedure while the receiver of the STA is turned on and the STA is not currently receiving or transmitting a packet, in order to detect the start of a signal from other entities that can be received (CS) and to determine whether the channel is clear prior to transmitting a packet (CCA).

In step S1410, the STA may receive a frame. Specifically, the STA may detect a SIG-A field of a frame. When receiving a frame, the STA may test a CRC of the received SIG-A field of the frame.

Meanwhile, in case of CRC Fail, the STA may set PHY-RXEND.indication primitive to indicate FormatViolation. Otherwise, the STA may set PHY-RXEND.indication primitive to other value (e.g., NoError, CarrierLost or UnsupportedRate)

In step S1420, the STA determines if a wireless medium is idle using a certain time interval. The STA may use the time interval specified by EIFS before performing a transmission in the wireless medium, when the STA determines that the medium is idle following reception of a frame for which the PHY-RXEND.indication primitive contained an error or a frame for which the MAC FCS value was not correct.

Here, the EIFS may be dynamically configured (or calculated or set) according to the present invention. For example, the EIFS is set to DIFS, if the frame has no CRC failure in receiving the SIG-A field of the received frame (or if the STA receives the frame for which the PHY-RXEND.indication primitive does not contain FormatViolation). Otherwise, the EIFS is derived by an equation of EIFS=aSIFSTime+DIFS+ACKTxTime, if the frame has CRC failure in receiving the SIG-A field of the received frame (or if the STA receives the frame for which the PHY-RXEND.indication primitive contains FormatViolation).

In step S1430, the STA may begin the transmission in the wireless medium, if the wireless medium is determined to be idle for the time interval specified by the EIFS. The STA may perform a backoff procedure, if the wireless medium is determined to be busy.

For the method according to the present invention as shown in FIG. 14, various embodiments of the present invention are performed independently or two or more embodiments of the present invention are performed simultaneously.

For purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 15:
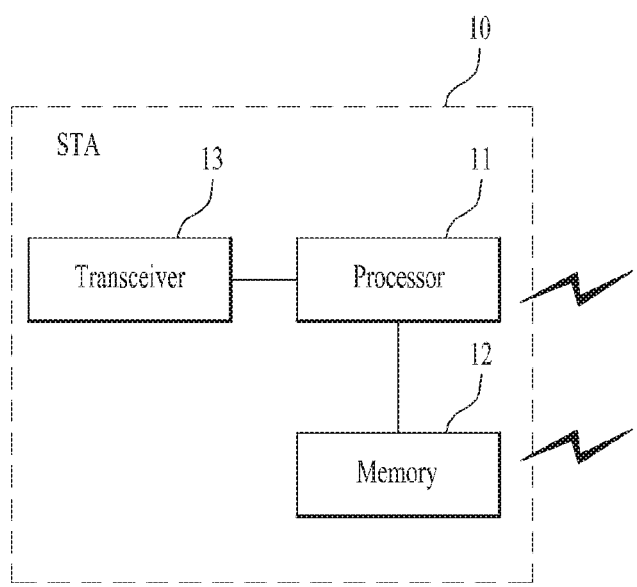
FIG. 15 is a block diagram illustrating a wireless device according the present invention.

FIG. 15 is a block diagram illustrating a wireless device according to the present invention.

Referring to FIG. 15, a STA 10 may include a processor 11, a memory 12, and a transceiver 13. The transceiver 13 may transmit/receive signals and may implement a physical layer according to an IEEE 802 system. The processor 11 may be connected to the transceiver 13, and may implement a physical layer and/or a MAC layer according to the IEEE 802 system. The processor 11 may be configured to operate according to the above described various embodiments of the present invention. Modules for implementing operation of the STA according to the above described various embodiments of the present invention are stored in the memory 12 and may be implemented by the processor 11. The memory 12 may be included in the processor 11 or may be installed at the exterior of the processor 11 to be connected by a known means to the processor 11.

The STA 10 shown in FIG. 15 may be configured to perform channel access scheme of the present invention. For example, the processor 11 may be configured to control the transceiver 13 to receive a frame. The processor 11 may be further configured to determine if a wireless medium is idle using an EIFS before performing a transmission in the wireless medium. The processor 11 may use the time interval specified by EIFS before performing a transmission in the wireless medium, when the processor 11 determines that the medium is idle following reception of a frame for which the PHY-RXEND.indication primitive contained an error or a frame for which the MAC FCS value was not correct.

Here, the EIFS may be dynamically configured (or calculated or set) according to the present invention. For example, the EIFS is set to DIFS, if the frame has no CRC failure in receiving the SIG-A field of the received frame (or if the STA receives the frame for which the PHY-RXEND.indication primitive does not contain FormatViolation). Otherwise, the EIFS is derived by an equation of EIFS=aSIFSTime+DIFS+ACKTxTime, if the frame has CRC failure in receiving the SIG-A field of the received frame (or if the STA receives the frame for which the PHY-RXEND.indication primitive contains FormatViolation).

In addition, the processor 11 may control the transceiver to begin the transmission in the wireless medium, if the wireless medium is determined to be idle for the time interval specified by the EIFS. The processor 11 may perform a backoff procedure, if the wireless medium is determined to be busy.

The overall configuration of the STA 10 may be implemented such that above described various embodiments of the present invention may be independently applied or two or more embodiments thereof may be simultaneously applied and a repeated description is omitted for clarity.

In addition, processor 11 may have multiple layer structures, MAC sublayer on data link layer (DLL) and Physical (PHY) layer among others. PHY may include physical layer convergence procedure (PLCP) entity and physical medium dependent (PMD) entity. Both the MAC sublayer and PHY conceptually include management entities, called MAC sublayer Management Entity (MLME) and physical layer management entity (PLME), respectively. These entities (MLME and PLME) provide the layer management service interfaces through which layer management functions may be invoked.

In order to provide correct MAC operation, an Station Management Entity (SME) is present within each STA. The SME is a layer independent entity that may be viewed as residing in a separate management plane or as residing "off to the side." The exact functions of the SME are not specified in this document, but in general the SME may be viewed as being responsible for such functions as the gathering of layer-dependent status from the various layer management entities (LMEs), and similarly setting the value of layer-specific parameters. SME would typically perform such functions on behalf of general system management entities and would implement standard management protocols.

The above described entities interact in various ways. For example, entities may be interact by exchanging GET/SET primitives. A primitive is a set of elements or parameters related to a specific purpose. XX-GET.request primitive is used for requesting the value of the given management information base attribute (MIBattribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

Various PLME_GET/SET primitives may be exchanged between PLME and SME via PLME_SAP, and between MLME and PLME via MLME-PLME_SAP.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

What is claimed:

1. A method by a station (STA) for channel access in a wireless local area network system, the method comprising:
receiving, by the STA, a frame comprising a first SIGNAL (SIG) field; and
sensing, by the STA, a wireless medium for determining whether the wireless medium is idle using a time interval specified by an Extended Inter-Frame Space (EIFS) before performing a transmission in the wireless medium, the time interval being specified by the EIFS when the frame has an error,
wherein the STA determines a length of the EIFS considering a type of the error in the frame,
wherein, if the error corresponds to a first type error that occurs when the first SIG field of the frame has a Cyclic Redundancy Code (CRC) failure, the EIFS is set to a sum of aSIFSTime, Distributed coordination function Inter-Frame Space (DIFS) and ACKTxTime, where the aSIFSTime is a nominal Short Inter-Frame Space (SIFS) value, and the an ACKTxTime is a time required to transmit an acknowledgement (ACK) frame, and
wherein, if the error does not correspond to the first type error, the EIFS is shortened to the DIFS.

2. The method according to claim 1,
wherein a physical layer-reception end indication (PHY-RXEND.indication) primitive does not contain a value of FormatViolation, if the first SIG field of the frame has no CRC failure.

3. The method according to claim 1,
wherein the DIFS is derived by an equation of DIFS=aSIFSTime+2×aSlotTime, and
wherein the aSlotTime is a nominal Slot duration.

4. The method according to claim 1,
wherein a physical layer-reception end indication (PHY-RXEND.indication) primitive contains a value of Format Violation, if the first SIG field of the frame has CRC failure in receiving the SIG-A field of the received frame.

5. The method according to claim 1,
wherein the first SIG field includes a Response frame indication field.

6. The method according to claim 5,
wherein the Response frame indication field indicates one of No Response, Null Data Packet (NDP) Response, Normal Response or Long Response, and
wherein a Network Allocation Vector (NAV) is set based on a frame type indicated by the Response frame indication field.

7. The method according to claim 1,
wherein the STA begins the transmission in the wireless medium, if the wireless medium is determined to be idle for the time interval specified by the EIFS.

8. The method according to claim 1,
wherein the STA performs a backoff procedure after waiting for the time interval specified by the EIFS, if the wireless medium is determined to be busy.

9. The method according to claim 1,
wherein the STA operates in Sub 1 GHz unlicensed band.

10. The method according to claim 1,
wherein the frame further comprises a second signal (SIG) field, and
wherein the EIFS is set based on the CRC status of the first SIG field of the received frame, regardless of CRC status of the second SIG field of the received frame.

11. The method according to claim 1,
wherein the type of the error is one of a plurality of error types including Format Violation, Carrier Lost or Unsupported Rate, and
wherein the first type error corresponds to the Format Violation.

12. A station (STA) device for channel access in a wireless local area network system, the STA device comprising:
a transceiver to receive a frame comprising a first SIGNAL (SIG) field; and
a processor to sense a wireless medium for determining whether the wireless medium is idle using a time interval specified by an Extended Inter-Frame Space (EIFS) before performing a transmission in the wireless medium, the time interval being specified by the EIFS when the frame has an error,
wherein the processor determines a length of the EIFS considering a type of the error in the frame,
wherein, if the error is a first type error that occurs when the first SIG field of the frame has a Cyclic Redundancy Code (CRC) failure, the EIFS is set to a sum of aSIFSTime, Distributed coordination function Inter-Frame Space (DIFS) and an ACKTxTime, where the aSIFSTime is a nominal Short Inter-Frame Space (SIFS) value, and the ACKTxTime is a time required to transmit an acknowledgement (ACK) frame, and
wherein, if the error is not the first type error, the EIFS is shortened to the DIFS.

* * * * *